Patented June 8, 1943

2,321,467

UNITED STATES PATENT OFFICE 2,321,467

MANUFACTURE OF TERTIARY BASES

Noel William Cusa, Blackley, Manchester, England, assignor to Imperial Chemical Industries Limited, a corporation of Great Britain No Drawing. Application June 14, 1940, Serial No. 340,535. In Great Britain July 4, 1939

6 Claims. (Cl. 260—404)

This invention relates to the manufacture of tertiary bases.

In British Specification 466,853 there is claimed a process for the manufacture of condensation products by causing polymeric formaldehyde and sulphurous acid to act at elevated temperatures and in the presence of tertiary amines on certain amides of aliphatic carboxylic acids containing at least 8 carbon atoms. It is also said that methylolamide compounds of higher fatty acids also yield the same valuable products by reaction with sulphurous acid and the tertiary amines. Tertiary amines specifically mentioned in the specification are pyridine and triethylamine. The condensation products exemplified as being made in accordance with the process of the said invention are soluble in water. There is evidence that water-soluble condensation products so made are quaternary salts having a fatty acid radicle attached through methyl to the quaternary nitrogen (see British Specification 477,991).

Similar water-soluble condensation products are also disclosed in British Specification 486,026 and there is therein exemplified a reaction product made from iso-octyl-phenoxy acetic acid ethylamide, paraformaldehyde and sulphur dioxide in presence of dimethylaniline, but it is not explicitly stated whether this reaction product is water-soluble.

Notwithstanding that dimethylaniline is specifically mentioned in Specification No. 486,026, I have now found that by reacting together an amide of a higher fatty acid, paraformaldehyde, sulphur dioxide and a N-dialkylaniline, water-insoluble tertiary bases can be obtained in good yield. Thus, starting from stearamide, paraformaldehyde, dimethylaniline and sulphur dioxide I obtained a good yield of stearamidomethyl-dimethylaniline. Similarly, I have found that by reacting together a methylolamide of a higher fatty acid, for example, methylolstearamide, sulphur dioxide and a N-dialkylaniline, the said water-insoluble tertiary bases are obtained in good yield. The said water-insoluble tertiary bases, especially when converted to the corresponding quaternary ammonium compounds by treatment with alkylating agents such as dimethyl sulphate, are valuable textile treating agents.

According to the present invention I manufacture water-insoluble tertiary bases of the formula

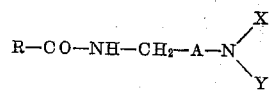

where R stands for the radical of a fatty acid of at least 12 carbon atoms, A stands for a benzene nucleus and X and Y stand for the same or different alkyl groups, by reacting together an amide RCONH₂ (where R has the significance given above), paraformaldehyde, sulphur dioxide and a N-dialkylaniline.

Also as a modification of the invention I manufacture the said water-insoluble tertiary bases by reacting together a methylolamide of the formula RCONHCH₂OH (obtainable by interaction of paraformaldehyde with an amide RCONH₂ as hereinbefore defined), sulphur dioxide and a N-dialkylaniline.

As suitable N-dialkylanilines there come into consideration for example, dimethylaniline, methylethylaniline and diethylaniline.

As reagents providing a higher fatty acid radical I may use the amides or methylolamides of, for example, lauric, myristic, stearic, palmitic, oleic or coconut oil fatty acids or other higher fatty acids of the naturally occurring fatty oils, fats or waxes.

The manufacture of water-insoluble bases according to the invention can conveniently be carried into effect by reacting together the appropriate reagents at moderately raised temperatures, for example, 90°–100° C. In general, in order to obtain the best yields I find it advantageous to use an excess of the dialkylaniline over that theoretically required for interaction with any particular amide used as starting material. This is not inconvenient in practice since any excess serves as a liquid diluent for the reaction mixture thus facilitating the passage of gaseous sulphur dioxide and at the end of reaction is readily recoverable, for example, by steam distillation. A convenient ratio is, for example, 1 molecular equivalent of amide to about 10 molecular equivalents of dialkylaniline.

Where the starting material for the invention is a fatty acid amide it is advantageous but not essential to use an amount of paraformaldehyde not greatly in excess of that theoretically required to form the corresponding methylolamide. Any excess of paraformaldehyde is capable of reacting with the excess of dialkylaniline to form by-products, for example, in the case of dimethylaniline there may be formed some di-(4-dimethylaminophenyl)-methane. Such formation of by-products does not necessarily decrease the yield of desired water-insoluble base and purification may readily be effected, if desired, since the by-products are in general soluble in dilute aqueous acetic acid whilst the desired bases are at most very sparingly soluble. Where a preformed methylolamide is used as starting material it will readily be understood that the likelihood of such by-product formation is almost excluded.

The tertiary bases made in accordance with the invention are in general solids of relatively low melting point and, as said, insoluble in water although soluble in dilute mineral acids such as hydrochloric acid to give foaming solutions. The bases are soluble in ethanol from which solvent they may be further purified by recrystallisation. The quaternary salts derived therefrom by alkylation are soluble in water and are useful for the softening of textiles.

The invention is illustrated but not limited by the following examples in which the parts are by weight.

Example 1

20 parts of stearamide are dissolved in 100 parts of dimethylaniline and then 10 parts of paraformaldehyde are added. The mixture is heated and stirred at 100° C. and gaseous sulphur dioxide passed in until after about 5 hours a test portion of the reaction mixture is soluble in dilute aqueous hydrochloric acid. The total reaction mixture is then poured into 250 parts of water, made alkaline to Brilliant Yellow paper by addition of aqueous 2N sodium hydroxide, and excess of dimethylaniline removed by steam distillation. The aqueous dimethylaniline-free distillation residue is cooled to 20° C. and the solid portion filtered off. The solid is now digested with a dilute aqueous acetic acid to remove any di-(4-dimethylaminophenyl)-methane, filtered, and finally washed with cold water. The stearamido-methyl-dimethylaniline, thus obtained (30 parts) melts at 55°–60° C., is insoluble in water but soluble in dilute aqueous hydrochloric acid to give foaming solutions. It may be further purified if desired by recrystallisation from ethanol.

Example 2

22 parts of methylolstearamide are dissolved in 100 parts of dimethylaniline and the mixture is heated and stirred at 100° C. and gaseous sulphur dioxide passed in until after about 5 hr. a test portion of the reaction mixture is soluble in dilute aqueous hydrochloric acid. The total reaction mixture is then poured into 250 parts of water, made alkaline to Brilliant Yellow paper by addition of aqueous 2N sodium hydroxide, and excess of dimethylaniline removed by steam distillation. The aqueous dimethylaniline-free distillation residue is cooled to 20° C. and the solid portion is filtered off. The stearamidomethyl-dimethylaniline so obtained contains a small proportion of material insoluble in aqueous hydrochloric acid which may be removed by crystallisation from ethyl alcohol, discarding the more sparingly soluble material. The resulting product (26 parts) dissolves in dilute aqueous hydrochloric acid to give a clear foaming solution.

Example 3

22 parts of methylololeamide are added to 100 parts of dimethylaniline. The mixture is heated to 100° C. and stirred and a stream of sulphur dioxide is passed in until, after about 4 hours, a test portion gives a clear foaming solution in dilute aqueous hydrochloric acid. The whole reaction product is then poured into water and made alkaline to Brilliant Yellow paper by addition of caustic soda, and the excess of dimethylaniline is removed by steam distillation. The aqueous dimethylaniline-free distillation residue is cooled and extracted with ether. The ether extract is dried over anhydrous magnesium sulphate and then freed from ether by evaporation. The product (20 parts) is a pale-brown wax giving a clear foaming solution in dilute aqueous hydrochloric acid. It is essentially oleamidomethyl-dimethylaniline.

I claim:

1. A process for the manufacture of a water-insoluble tertiary base of the formula

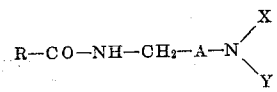

where R—CO— stands for the radical of a fatty acid having at least 12 carbon atoms, A stands for a benzene nucleus, and X and Y stand for alkyl groups, which comprises passing sulphur dioxide into a solution of reactants maintained at a temperature of approximately 90°–100° C. selected from the group consisting of (a) a solution of an acid amide, R—CO—NH₂, and paraformaldehyde in a N-dialkylaniline, and (b) a solution of a methylolamide,

in a N-dialkylaniline, R—CO— in both instances standing for the radical of a fatty acid having at least 12 carbon atoms.

2. A process for the manufacture of a water-insoluble tertiary base of the formula

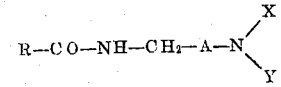

where R—CO— stands for the radical of a fatty acid having at least 12 carbon atoms, A stands for a benzene nucleus, and X and Y stand for alkyl groups, which comprises passing gaseous sulphur dioxide into a solution of paraformaldehyde and an acid amide, R—CO—NH₂ in which R—CO— stands for the radical of a fatty acid having at least 12 carbon atoms, in an excess of a N-dialkylaniline, said solution being maintained at a temperature of approximately 90°–100° C. during the course of the reaction.

3. A process for the manufacture of a water-insoluble tertiary base of the formula

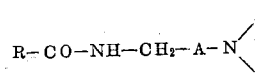

where R—CO— stands for the radical of a fatty acid having at least 12 carbon atoms, A stands for a benzene nucleus, and X and Y stand for alkyl groups, which comprises passing gaseous sulphur dioxide into a solution of a methylolamide of a higher fatty acid in an excess of a N-dialkylaniline, said methylolamide having the general formula: R—CO—NHCH₂OH in which R—CO— stands for the radical of a fatty acid having at least 12 carbon atoms, said solution being maintained at a temperature of approximately 90°–100° C. during the course of the reaction.

4. A process of making stearamidomethyl-dimethylaniline which comprises passing sulphur dioxide into a solution of stearamide and paraformaldehyde in dimethylaniline, said solution being maintained at a temperature of approximately 90°–100° C. during the course of the reaction.

5. A process of making stearamido-methyl-dimethylaniline which comprises passing sulphur dioxide into a solution of methylolstearamide in dimethylaniline, said solution being maintained at a temperature of approximately 90°–100° C. during the course of the reaction.

6. A process of making oleamido-methyl-dimethylaniline which comprises passing sulphur dioxide into a solution of methylololeamide in dimethylaniline, said solution being maintained at a temperature of approximately 90°–100° C. during the course of the reaction.

NOEL WILLIAM CUSA.